United States Patent
Laalaoua

(10) Patent No.: US 7,369,767 B2
(45) Date of Patent: May 6, 2008

(54) METHOD OF DETERMINING A SPECTRAL ROUTE IN AN OPTICAL TELECOMMUNICATIONS NETWORK

(75) Inventor: Rachid Laalaoua, Longjumeau (FR)

(73) Assignee: Alcatel, Paris (FR)

( * ) Notice: Subject to any disclaimer, the term of this patent is extended or adjusted under 35 U.S.C. 154(b) by 549 days.

(21) Appl. No.: 10/885,587

(22) Filed: Jul. 8, 2004

(65) Prior Publication Data

US 2005/0008367 A1    Jan. 13, 2005

(30) Foreign Application Priority Data

Jul. 11, 2003    (FR) .................................. 03 08521

(51) Int. Cl.
*H04J 14/00* (2006.01)
*H04L 12/28* (2006.01)

(52) U.S. Cl. ........................... 398/57; 398/48; 398/49; 370/400

(58) Field of Classification Search ............ 398/48–50, 398/57; 370/400, 406
See application file for complete search history.

(56) References Cited

U.S. PATENT DOCUMENTS 5,586,128 A * 12/1996 Chen .......................... 714/792
2005/0069314 A1* 3/2005 De Patre et al. ................ 398/5

FOREIGN PATENT DOCUMENTS

WO    WO 03/079596 A1    9/2003

OTHER PUBLICATIONS

Lightpath (Wavelength) Routing in Large WDM Networks. Chlamtac et al. IEEE Journal on Selected Areas in Communications, vol. 14, No. 5, Jun. 1996, pp. 909-913.*

I. Chlamtac et al, "Lightpath (Wavelength) Routing in Large WDM Networks", IEEE Journal on Selected Areas in Communications, vol. 14, No. 5, Jun. 1996, pp. 909-913, XP002269894.

T. Cinkler t al, "Heuristic algorithms for joint configuration of the optical and electrical layer in multi-hop wavelength routing networks", INFOCOM 2000. Nineteenth Annual Joint Conference of the IEEE Computer and Communications Societies. Proceedings. IEEE Tel Aviv, Israel, Mar. 26-30, 2000, Mar. 26, 2000, pp. 1000-1009, XP010376190.

(Continued)

*Primary Examiner*—Shi K. Li
*Assistant Examiner*—Nathan Curs
(74) *Attorney, Agent, or Firm*—Sughrue Mion, PLLC

(57) ABSTRACT

In order to determine a spectral route between a departure node (N1) and an arrival node (N6) in a WDM optical telecommunications network, the method comprises a step of determining a spatial route connecting the departure node to the arrival node, said spatial route comprising a sequence of route segments (Li), each route segment directly interconnecting two network nodes and being capable of conveying at least one wavelength. The method further comprises the following steps:

identifying wavelengths that are usable along each of the route segments; and constructing a graph in which the vertices $(i, f_k, \lambda_l)$ are the wavelengths usable in the route segments and the arcs joining each of two consecutive vertices are the transitions between the wavelengths represented respectively by said consecutive vertices.

Each of the arcs is given a distance corresponding to a determined cost of wavelength transition, and finally the shortest path through the graph is determined by an algorithm for determining shortest path.

4 Claims, 2 Drawing Sheets

OTHER PUBLICATIONS

I. Chlamtac et al, "Efficient routing of lightpaths", Military Communications Conference, 1996, Milcom '96, Conference Proceedings, IEEE, McLean, VA, Oct. 21-24, 1996—Oct. 21, 1996, pp. 108-111, XP010203962.

"Size Reduction of Lattices", Association for Computing Machinery, 'en ligne! Sep. 30, 1998, XP002269895.

A. Bagchi, "Route Selection with Multiple Metrics", Information Letters, Amsterdam, NL, vol. 64, No. 4 1997, pp. 203-250, XP000669933.

J. Strand et al, "Importance of Wavelength Conversion in an Optical Network", Optical Networks Magazine, SPIE, Bellingham, WA, US, vol. 2, No. 3 May 2001, pp. 33-34, XP001081229.

* cited by examiner

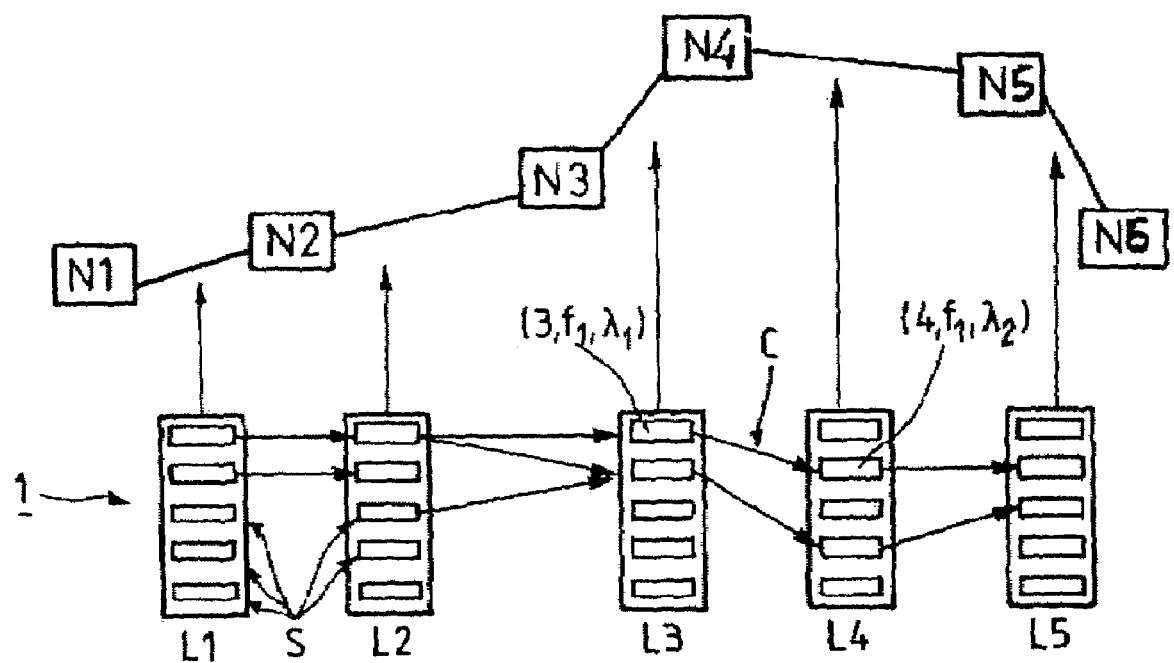
FIG_1

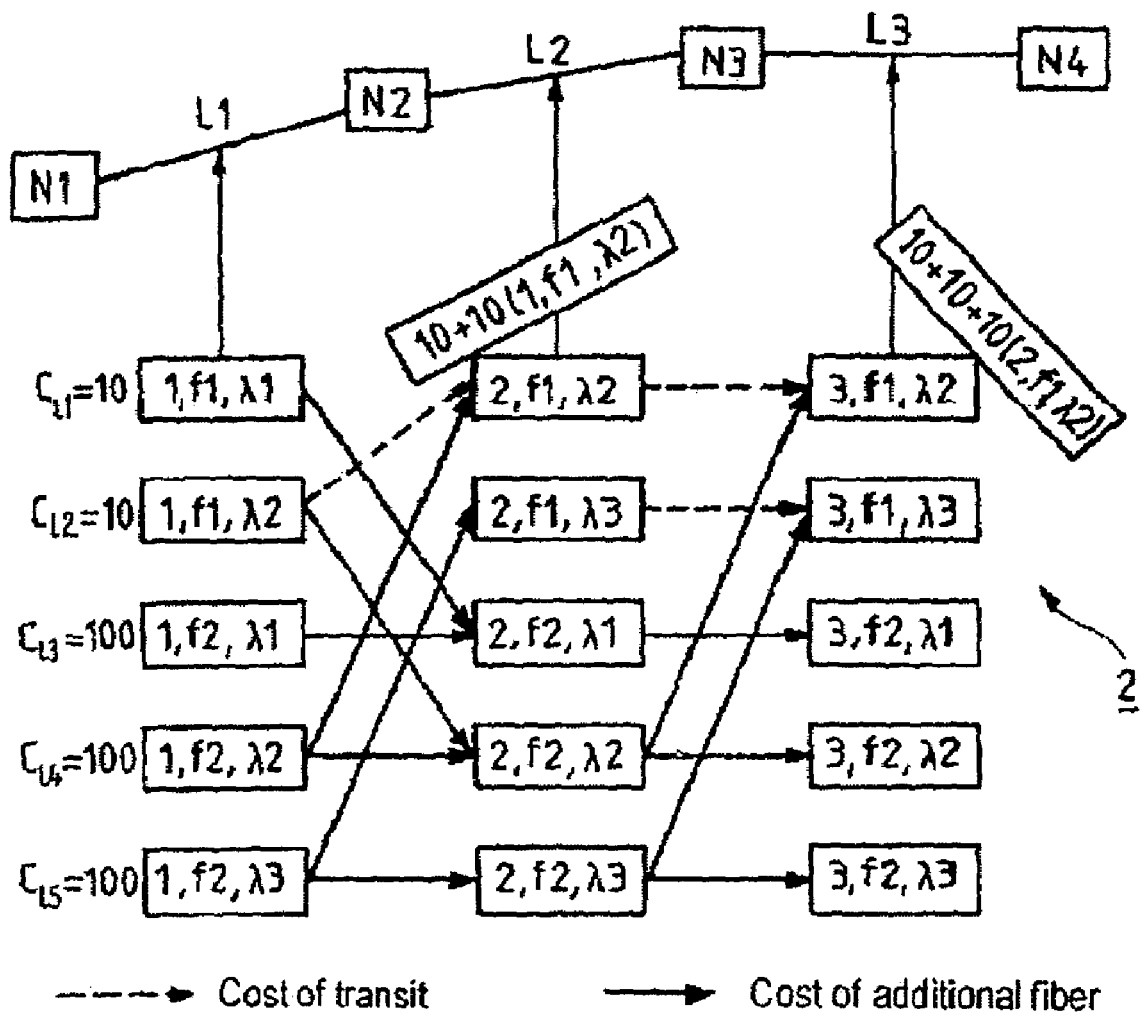

METHOD OF DETERMINING A SPECTRAL ROUTE IN AN OPTICAL TELECOMMUNICATIONS NETWORK

The present invention relates to a method of determining a spectral route in an optical telecommunications network. It relates more particularly to wavelength division multiplexed (WDM) optical networks which use a plurality of wavelengths for simultaneously conveying a plurality of data streams along a single optical fiber.

Telecommunications are expanding considerably. More and more users (individuals and businesses) are sending increasing numbers of messages over telecommunications networks. In addition, these messages are conveying ever increasing quantities of information, for example when images are sent. In order to satisfy this increasing demand for data rate, telecommunications network operators are making use of optical signal transmission. Such transmission modulates light signals with the information that is to be transmitted, the light signals generally being produced by means of lasers, and the modulated signals are then caused to propagate within a network of optical fibers or light conductors.

Optical signal transmission presents several advantages. In particular, signal attenuation during transmission is less than with electrical signals, and optical fibers are stronger and lighter in weight than their electrical equivalents. However, the main advantages lie in the large passband of optical fibers and the possibility of causing a plurality of carriers at different wavelengths to travel simultaneously in a single fiber. This technique is known as wavelength division multiplexing and makes it possible to obtain data rates of the order of gigabits per second and even of the order of terabits per second.

In order to establish a connection in an optical telecommunications network, it is necessary to determine not only the spatial route constituted by a sequence of route segments connecting the departure node to the arrival node, but it is also necessary to determine the spectral route, since each segment can support a plurality of wavelengths, each constituting a spectral route segment. Selecting a spectral route consists in selecting one or more wavelengths for use in succession over the various segments along the spatial route.

In known manner, several algorithms can be used to allocate a wavelength to a spatial segment. Such algorithms are described in particular in the document entitled "Wavelength converters in dynamically reconfigurable WDM networks" (J. M. Yates, M. and M. P. Rumsewicz, IEEE Communications Surveys).

A first solution consists in using an algorithm of allocating the first available wavelength (known as "first-fit wavelength evaluation").

A second solution consists in using an algorithm for allocating the most used wavelength ("most used wavelength evaluation"). A decision is taken as a function of network statistics concerning wavelength usage. This second solution seeks to optimize wavelength use by filling the non-used portions of the most-used wavelength.

Implementing the above-mentioned solutions nevertheless present certain difficulties insofar as they are not adapted for optical networks that are partially transparent (i.e. no regeneration by wavelength conversion at certain nodes of the networks); those solutions assume that wavelength conversion is available at each node of the network (i.e. network nodes that are opaque).

In addition, the wavelength allocation algorithm that is in the most widespread use requires overall knowledge of the state of the network to be kept up to date, which leads to significant extra expense.

The present invention seeks to provide a method of determining a spectral route in an optical telecommunications network, which method can be implemented at low cost both on optical networks that are of the transparent type and/or on networks that are of the opaque type, and that accommodates parameterization and thus a degree of flexibility for users.

To this end, the present invention provides a method of determining a spectral route in an optical telecommunications network between a departure node and an arrival node belonging to said network, the method comprising a step of using a conventional routing method to determine a spatial route connecting said departure node to said arrival node, said spatial route comprising a sequence of route segments, each route segment directly interconnecting two nodes of said network and being capable of conveying at least one wavelength or wavelength band, the method being characterized in that it further comprises the following subsequent steps:

identifying the wavelengths or wavelength bands ($\lambda_1$-$\lambda_3$) that can be used along each of said route segments of said spatial route;

constructing a graph made up of vertices and arcs interconnecting vertices in pairs, in which:

each vertex ($[i, f_k, \lambda_l]$) is associated with one of said route segments and represents a wavelength or wavelength band that can be used along said associated route segment; and each arc is associated with one of said nodes of said spatial route and joins two consecutive vertices associated respectively with consecutive route segments interconnected via said associated node, and represents a transition from a first wavelength or wavelength band to a second wavelength or wavelength band represented respectively by said consecutive vertices, said transition corresponding to a wavelength conversion that can be performed by said associated node, each of said arcs being given a distance corresponding to a cost that is allocated to said transition; and determining the shortest path through this graph by an algorithm for determining shortest path.

By means of the invention, the spectral route is determined on the basis of weighting by cost. The user can fix each cost in flexible manner, so the user can thus encourage one selection compared with another. The method of the invention is applicable to optical networks of the transparent and/or opaque type insofar as infinite cost can be associated with an impossible transition between two different wavelengths at a node that is transparent.

It should be observed that the algorithm applies to a graph which represents only one particular spatial route, and not the entire network, as is the case in certain prior art methods. This simplifies the algorithm greatly, thus making it easier, or indeed possible, to achieve the above-mentioned flexibility.

It should be observed that the method of the invention applies to two types of granularity, granularity associated with switching wavelengths and granularity associated with switching wavelength bands. For reasons of clarity, reference is made below solely to wavelength routing.

Advantageously, an initial cost can be allocated to each of the vertices, and when a route segment can be equipped with a plurality of optical fibers, at least one vertex associated with said segment is provided to which an initial cost is allocated that corresponds to implementing an additional fiber in said segment, the transition cost allocated to each arc coming from said vertex then including said initial cost. This initial cost makes it possible to take account of the possibility of implementing a variable number of optical fibers in some or all of the route segments.

In a particular advantageously embodiment, said algorithm for determining the shortest path is a Viterbi algorithm. The proposed graph is particularly well adapted to this algorithm, which is not true of other types of graph, in particular those in which the vertices and the arcs represent respectively the nodes and the route segments of the network.

Several types of shortest-path network can nevertheless be used, such as the Dijkstra algorithm. Nevertheless, the Dijkstra algorithm can be relatively complex and slow when the number of nodes becomes high. Using the graph of the invention makes it possible advantageously to use the Viterbi algorithm which is faster and which is used for decoding convolutional codes (error correcting decoding). The Viterbi algorithm amounts to looking for the path which is the most favorable, i.e. the shortest relative to the defined metric, and thus the path which corresponds to the lowest cost. The graph of the invention is in the form of columns each combining the vertices associated with a given route segment. The algorithm consists in examining the columns of the graph one by one and in totalizing the cost of going from each vertex in one column to each one vertex in the following column in order to obtain the total cost. For each vertex of the graph, the vertex is identified in the preceding column that implies the lowest total cost, and this minimum cost is stored together with the identity of the preceding vertex that enables this minimum cost to be obtained. At the end of the graph (last column), once the vertex has been found which corresponds to the smallest total cost, it suffices to follow through the graph in the opposite direction passing via the vertices that have been stored, in order to determine the shortest path.

Advantageously, said transition cost satisfies one of the following conditions:
 the transition cost is infinite when said transition is not possible;
 the transition cost includes a wavelength conversion cost; and
 the transition cost includes a cost of transiting through a transparent node.

Other characteristics and advantages of the present invention appear from the following description of an embodiment of the invention given by way of non-limiting illustration.

In the accompanying figures:

FIG. 1 shows a graph for implementing the method of the invention; and

FIG. 2 shows an example of implementing the method of the invention.

FIG. 1 shows a graph 1 for determining a spectral route in an optical telecommunications network between a departure node N1 and an arrival node N6 belonging to the network.

On receiving a request to set up a connection, the spatial route between node N1 and node N6 is determined in known manner by a conventional routing algorithm such as the Dijkstra algorithm. It is recalled that the Dijkstra algorithm consists in keeping up to date a set E of nodes for which the shortest distance from the departure node is known. Initially, this set contains only the departure node itself. On each step in the algorithm, an additional node is added to the set, until the set includes the arrival node.

The spatial route as determined in this way comprises six nodes N1 to N6 interconnected by links or route segments L1 to L5.

The links L1 to L5 serve to construct the vertices S of the graph 1. Each link Li (where i lies in the range 1 to 5) actually comprises $n_i$ optical fibers, with each of the $n_i$ optical fibers j (j lying in the range 1 to $n_i$) being capable of carrying $n_{ij}$ wavelengths. For reasons of clarity, each link L1 to L5 is shown as having five available wavelengths that may be distributed over one or more optical fibers.

Thus, each vertex S represents a wavelength that is usable in one of the fibers of the link associated with the vertex. In other words, each vertex S can be identified by a triplet (i, $f_k$, $\lambda_l$), where i is the number of the link, $f_k$ designates the k-th fiber of link i (k lying in the range 1 to $n_i$), and $\lambda_l$ designates the l-th wavelength in fiber $f_k$ (l lying in the range 1 to $n_{ij}$). By way of example, the vertices (3, $f_1$, $\lambda_1$) (i.e. link 3, fiber 1 of link 3, wavelength 1 of fiber 1 of link 3), and (4, $f_1$, $\lambda_2$) (i.e. link 4, fiber 1 of link 4, wavelength 2 of fiber 1 of link 4), are shown in FIG. 1.

At each transition between two vertices (i, $f_k$, $\lambda_l$) and (i+1, $f_{k'}$, $\lambda_{l'}$) there is associated a predetermined transition cost $C([i,f_k,\lambda_l]?[i+1,f_{k'},\lambda_{l'}])$. Thus, transition cost C identified in FIG. 1 designates the cost $C([3,f_1,\lambda_l]?[4,f_1,\lambda_2])$. The arcs are the transitions between the wavelengths available at two consecutive vertices, and each arc is given a transition cost. It should be observed that only a few transitions are represented by arrows for the purpose of illustrating the method of the invention. In practice, it is possible for there to exist a transition corresponding to each pair of vertices associated respectively with one link and with the following link.

A transition cost may be determined, for example, by the following conditions:
 the transition cost is infinite when said transition is not possible (as applies to a node that is transparent and the transition is between two different wavelengths);
 the transition cost includes the cost of wavelength conversion (as applies to regeneration by wavelength conversion in a node of opaque type); and
 the transition cost includes the cost of transiting through a transparent node (transit from one wavelength to the same wavelength can also lead to additional costs).

It should be observed that these costs are defined by the user who can thus put more emphasis on one of the costs than on the others, and can use cost as a weighting parameter so as to obtain a certain amount of flexibility.

In particular, when certain links (or route segments) are equipped with a plurality of optical fibers, it can be necessary to implement a greater or smaller number of optical fibers in order to be capable of ensuring transitions without wavelength conflicts. To take this possibility into account, an initial cost can be introduced that can be attributed to each of the vertices of the graph. For each of these links, at least one associated vertex is provided which is given an initial cost corresponding to implementing an additional fiber in the link. The transition costs allocated to any arc coming from such a vertex will then include the initial cost. In other words, the transition cost will be the sum of the initial cost plus the other costs that need to be taken into account for the transition under consideration, such as wavelength conversion.

Once the graph has been constructed, it remains to determine the shortest spectral path for going from the departure node N1 to the arrival node N6, on the assumption that the distances in the graph are constituted by the above-mentioned costs.

The Viterbi algorithm lends itself particularly well to determining this kind of shortest path. This algorithm is known and described in the document "Principles of digital communications and coding" (A. J. Viterbi, J. K. Omura, McGraw-Hill, 1979), and "The Viterbi algorithm" (G. D. Forney, Proceedings of the IEEE, Vol. 61, No. 3, pp. 268-278, March 1973).

The principle of the Viterbi algorithm is as follows:

It starts with the vertices associated with link L1. All possible arcs from these vertices are drawn to the vertices of link L2, each arc having an associated cost. For each vertex of link L2, the arc coming from the vertices of L1 with the lowest cost is determined. This cost is given to the corresponding vertex of L2 and the triplet $(1, f_k, \lambda_l)$ corresponding to the vertex of L1 associated with this lowest cost is stored for the vertex of L2. Thus, each vertex of L2 is associated with a minimum cost and with a corresponding triplet of L1.

This operation is repeated for the arcs corresponding to transitions from vertices of L2 to vertices of L3, taking into consideration the minimum cost and possibly also the initial cost of the vertices of L2. Thus, for each arc, the transition cost and the minimum cost of the departure vertex in L2 are summed, the transition cost possibly including an initial cost of the departure vertex. Each vertex of L3 then has associated therewith a minimum cost and a triplet of L2.

The operation is repeated all the way to link L5 in which each vertex thus possesses a cost and a triplet in L4. It is then determined which vertex in L5 has the lowest cost.

Since each vertex has associated therewith the triplet of the preceding link that corresponds to the minimum cost, it then suffices to work back from the vertex of L5 to the vertex of L1 in order to determine the looked-for spectral path.

FIG. 2 shows an implementation of the method of the invention.

This implementation follows a result to set up a connection between a node N1 and a node N4 in the network. The spatial path calculated by the Dijkstra algorithm is defined by the path N1, N2, N3, and N4. Three route segments L1 to L3 are thus defined.

We consider a first fiber $f_1$ and an added additional fiber $f_2$.

It is also assumed that the nodes N2 and N3 do not permit wavelength conversion and that the capacity of each of the fibers is limited to three wavelengths $\lambda_1$, $\lambda_2$, and $\lambda_3$.

The set of wavelengths usable on the links is:

L1={$\lambda_1$ on fiber 1, $\lambda_2$ on fiber 1}+all three wavelengths of the additional fiber;

L2={$\lambda_2$ on fiber 1, $\lambda_3$ on fiber 1}+all three wavelengths of the additional fiber; and L3={$\lambda_2$ on fiber 1, $\lambda_3$ on fiber 1}+all three wavelengths of the additional fiber.

The transition costs are as follows:

costs of additional fiber=100 (represented by a continuous line arrow); and transit cost=10 (represented by a dashed line arrow).

In addition, an initial cost $C_{i1}$ to $C_{i5}$ is associated with each of the vertices of the first route segment and corresponds to the cost of the transition between the departure node N1 and each of the vertices of the first route segment.

The Viterbi algorithm then determines the following elements:

the vertex $(2, f_1, \lambda_2)$ of the link L2 has a minimum cost of "10+10" and the preceding stored vertex is the vertex $(1, f_1, \lambda_2)$ of link L1; and the vertex $(3, f_2, \lambda_2)$ has a minimum cost of "10+10" and the stored preceding vertex is the vertex $(2, f_1, \lambda_2)$ of link L2.

The Viterbi algorithm thus makes it possible to define the spectral path as follows:

$(1, f_1, \lambda_2)$: $\lambda_2$ on fiber 1 for link 1;

$(2, f_1, \lambda_2)$: $\lambda_2$ on fiber 1 for link 2;

$(3, f_1, \lambda_2)$: $\lambda_2$ on fiber 1 for link 3.

Naturally, the invention is not limited to the embodiment described above.

In particular, the invention is described for selecting wavelength, but it would equally well be possible to envisage routing by wavelength bands.

What is claimed is:

1. A method of determining a spectral route in an optical telecommunications network between a departure node and an arrival node belonging to said network, the method comprising a step of using a routing method to determine a spatial route connecting said departure node to said arrival node, said spatial route comprising a sequence of route segments, each route segment directly interconnecting two nodes of said network and being capable of conveying at least one wavelength or wavelength band, the method being characterized in that it further comprises the following subsequent steps:

identifying at least one wavelength or wavelength band that can be used along each of said route segments of said spatial route;

constructing a graph made up of vertices and arcs interconnecting vertices in pairs, in which:

each vertex is associated with one of said route segments and represents a wavelength or wavelength band that can be used along said associated route segment; and each arc is associated with one of said nodes of said spatial route and joins two consecutive vertices associated respectively with consecutive route segments interconnected via said associated node, and represents a transition from a first wavelength or wavelength band to a second wavelength or wavelength band represented respectively by said consecutive vertices, said transition corresponding to a wavelength conversion that can be performed by said associated node, each of said arcs being given a distance corresponding to a cost that is allocated to said transition; and determining the shortest path through this graph by an algorithm for determining shortest path.

2. The method according to claim 1, wherein a route segment is equipped with a plurality of optical fibers, an initial cost is allocated to a vertex associated with said route segment, said initial cost corresponds to implementing an additional fiber in said route segment, and the transition cost allocated to each arc coming from said vertex includes said initial cost.

3. The method according to claim 1, characterized in that said algorithm for determining the shortest path is a Viterbi algorithm.

4. The method according to claim 1, characterized in that said transition cost satisfies one of the following conditions:

said transition cost is treated as being infinite if said transition is not possible because said associated node cannot perform said transition;

said transition cost includes a wavelength conversion cost;

and said transition cost includes a cost of transiting through a transparent node.

* * * * *